(12) United States Patent
Reiffel

(10) Patent No.: US 7,137,711 B1
(45) Date of Patent: Nov. 21, 2006

(54) MULTI-USER RETRO REFLECTOR DATA INPUT

(76) Inventor: Leonard Reiffel, 602 Deming Pl., Chicago, IL (US) 60614

( * ) Notice: Subject to any disclaimer, the term of this patent is extended or adjusted under 35 U.S.C. 154(b) by 0 days.

(21) Appl. No.: 10/203,735
(22) PCT Filed: Mar. 21, 2000
(86) PCT No.: PCT/US00/07538

§ 371 (c)(1),
(2), (4) Date: Aug. 13, 2002

(87) PCT Pub. No.: WO01/71397

PCT Pub. Date: Sep. 27, 2001

(51) Int. Cl.
*G02B 5/12* (2006.01)

(52) U.S. Cl. .................. 359/516; 359/517; 356/152.3
(58) Field of Classification Search ......... 359/515–530, 359/533, 169, 170; 398/169–170; 116/209; 356/152.3, 141.1; 340/557

See application file for complete search history.

(56) References Cited

U.S. PATENT DOCUMENTS

| | | | |
|---|---|---|---|
| 4,053,233 A | 10/1977 | Bein | |
| 4,099,050 A | 7/1978 | Sauermann | |
| 4,228,430 A | 10/1980 | Iwamura et al. | |
| 4,439,672 A | 3/1984 | Salaman | |
| 4,603,231 A | 7/1986 | Reiffel et al. | |
| 4,637,797 A | 1/1987 | Whitney et al. | |
| 4,650,334 A | 3/1987 | Alster et al. | |
| 4,684,349 A | 8/1987 | Ferguson et al. | |
| 4,945,914 A | 8/1990 | Allen | |
| 4,998,441 A | 3/1991 | Stuart | |
| 5,107,350 A | 4/1992 | Omori | |
| 5,111,410 A | 5/1992 | Nakayama et al. | |
| 5,181,015 A | 1/1993 | Marshall et al. | |

(Continued)

FOREIGN PATENT DOCUMENTS

| | | |
|---|---|---|
| EP | 0 062 473 | 10/1982 |
| EP | 0 840 248 | 5/1998 |
| EP | 1 020 810 | 7/2000 |
| FR | 2 694 827 | 2/1994 |
| JP | 11-143629 | 5/1999 |
| WO | WO 87/07106 | 11/1987 |
| WO | WO 93/18478 | 9/1993 |
| WO | WO 96/32690 | 10/1996 |
| WO | WO 99/35836 | 7/1999 |
| WO | WO 99/66441 | 12/1999 |
| WO | WO 01/71397 | 9/2001 |
| WO | WO 01/84475 | 11/2001 |
| WO | WO 02/17037 | 2/2002 |
| WO | WO 02/17291 | 2/2002 |
| WO | WO 02/17293 | 2/2002 |
| WO | WO 02/48947 | 6/2002 |
| WO | WO 02/49340 | 6/2002 |
| WO | WO 02/49344 | 6/2002 |
| WO | WO 02/086807 | 10/2002 |

*Primary Examiner*—James Phan
(74) *Attorney, Agent, or Firm*—William J. Hallihan

(57) ABSTRACT

The apparatus uses retro-reflected light, having a fixed component (41) and a variable component (37) varied by a person, from a retro reflector (31) connected to a person to input data (37A) to an information system (13) and does this for each of several persons in the same time interval.

20 Claims, 1 Drawing Sheet

U.S. PATENT DOCUMENTS

| | | |
|---|---|---|
| 5,214,414 A | 5/1993 | Levine et al. |
| 5,260,556 A | 11/1993 | Lake et al. |
| 5,282,045 A | 1/1994 | Mimura et al. |
| 5,415,553 A | 5/1995 | Szmidla |
| 5,448,261 A | 9/1995 | Koike et al. |
| 5,453,015 A | 9/1995 | Vogel |
| 5,507,527 A | 4/1996 | Tomioka et al. |
| 5,537,211 A | 7/1996 | Dial |
| 5,563,401 A | 10/1996 | Lemelson |
| 5,644,126 A | 7/1997 | Ogawa |
| 5,710,416 A | 1/1998 | Belknap et al. |
| 5,712,658 A | 1/1998 | Arita et al. |
| 5,729,220 A | 3/1998 | Russell |
| 5,756,981 A | 5/1998 | Roustaei et al. |
| 5,789,732 A | 8/1998 | McMahon et al. |
| 5,795,161 A | 8/1998 | Vogel |
| 5,821,523 A | 10/1998 | Bunte et al. |
| 5,822,735 A | 10/1998 | De Lapa et al. |
| 5,825,045 A | 10/1998 | Koenck et al. |
| 5,826,578 A | 10/1998 | Curchod |
| 5,835,237 A | 11/1998 | Ebrahimi |
| 5,852,211 A | 12/1998 | Dumpelmann et al. |
| 5,867,265 A | 2/1999 | Thomas |
| 5,912,700 A | 6/1999 | Honey et al. |
| 5,917,472 A | 6/1999 | Perala |
| 5,917,486 A | 6/1999 | Rylander |
| 5,963,145 A | 10/1999 | Escobosa |
| 5,982,352 A | 11/1999 | Pryor |
| 5,988,505 A | 11/1999 | Shellhammer |
| 6,000,612 A | 12/1999 | Xu |
| 6,047,893 A | 4/2000 | Saporetti |
| 6,048,117 A | 4/2000 | Banton |
| 6,056,199 A | 5/2000 | Wiklof et al. |
| 6,082,619 A | 7/2000 | Ma et al. |
| 6,118,848 A | 9/2000 | Reiffel |
| 6,121,953 A | 9/2000 | Walker |
| 6,155,489 A | 12/2000 | Collins, Jr. et al. |
| 6,163,946 A | 12/2000 | Pryor |
| 6,167,607 B1 | 2/2001 | Pryor |
| 6,301,763 B1 | 10/2001 | Pryor |
| 6,311,214 B1 | 10/2001 | Rhoads |
| 6,314,631 B1 | 11/2001 | Pryor |
| 6,317,188 B1 | 11/2001 | Yoneno |
| 6,317,953 B1 | 11/2001 | Pryor |
| 6,330,973 B1 | 12/2001 | Bridgelall et al. |
| 6,335,685 B1 | 1/2002 | Schrott et al. |
| 6,542,083 B1 | 4/2003 | Richley et al. |
| 6,545,670 B1 | 4/2003 | Pryor |
| 6,708,885 B1 | 3/2004 | Pryor |
| 6,720,949 B1 | 4/2004 | Pryor |
| 6,750,848 B1 | 6/2004 | Pryor |
| 6,766,036 B1 | 7/2004 | Pryor |
| 2002/0036617 A1 | 3/2002 | Pryor |
| 2002/0183961 A1 | 12/2002 | French et al. |
| 2003/0222145 A1 | 12/2003 | Reiffel |
| 2004/0027455 A1 | 2/2004 | Reiffel |
| 2004/0041027 A1 | 3/2004 | Reiffel |
| 2004/0125224 A1 | 7/2004 | Reiffel |
| 2004/0135766 A1 | 7/2004 | Reiffel |
| 2004/0188525 A1 | 9/2004 | Reiffel |
| 2004/0195327 A1 | 10/2004 | Reiffel |

MULTI-USER RETRO REFLECTOR DATA INPUT

BACKGROUND

The invention uses retro-reflected light having a fixed component and a variable component varied by a person, from a retro reflector connected to a person to input data to an information system and does this for each of several persons in the same time interval.

Limits of data input via retro-reflected light—for example by Honey in U.S. Pat. No. 5,912,700 and by Stuart in U.S. Pat. No. 4,998,441—are surmounted by the discovery shown here.

SUMMARY

Light retro-reflected by a retro reflector connected to a person has a fixed component and a variable component and is detected by an imager which inputs data to an information system.

Other forms and objects of the invention will be comprehended in the drawings and description, which will make further equivalent forms and objects obvious hereafter to persons skilled in the art.

DRAWINGS

DESCRIPTION

Figure 1:
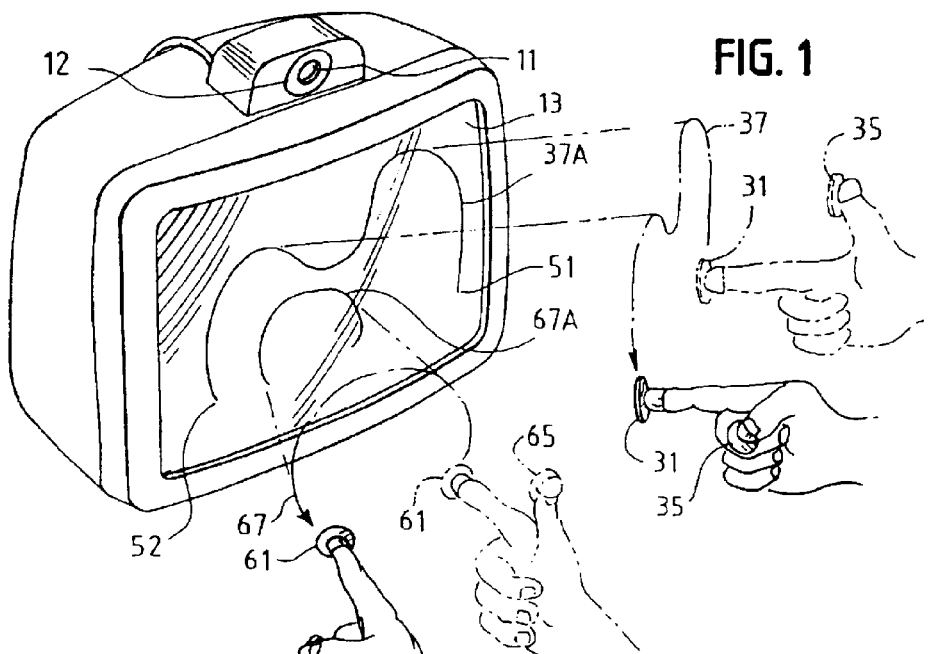
FIG. 1 shows two users inputting data to an information system.

The data input apparatus is used with an information system indicated by the display device 13 in FIG. 1. The data input apparatus comprises an imager indicated by a lens 11, a light source indicated by a ring light 12, and a retro reflector indicated by a retro-reflecting disc 31 on a hand portion of a person.

Though the retro reflector is on the person in the example of FIG. 1, the retro reflector can be connected to the person in various ways such as by being held by the person, by being on gear worn by the person, or by being on a device—such as an aircraft—transporting the person. The meaning of "connected to a person" here is distinct from connection by a signal.

Throughout use for data input, the retro reflector remains connected to the person. This is distinct from the case where retro-reflecting material is attached to an object—such as a thrown ball—which moves independently of the person.

Ideal retro-reflecting objects retro-reflect all incident light back coaxially along the path of the incident light. Thus, an imager adjacent to the light source will detect retro-reflected light—which is light from the light source retro-reflected by the retro reflector to the imager—with a high signal to noise ratio between the retro-reflected light and any other light detected by the imager. The signal to noise ratio becomes greater and smaller as retro-reflecting objects are more and less ideal.

"Adjacent" here means that the retro-reflected light is within the field of view of the imager. A light beam from the source and the retro-reflected light beam incident on the imager can be made precisely coaxial by using beam splitting devices, and this also is included in the meaning of "adjacent" here.

"Detect" here means that the imager locates the retro reflected light relative to the imager field of view—for example, as exposing specific pixels of a charge coupled device.

Figure 2:
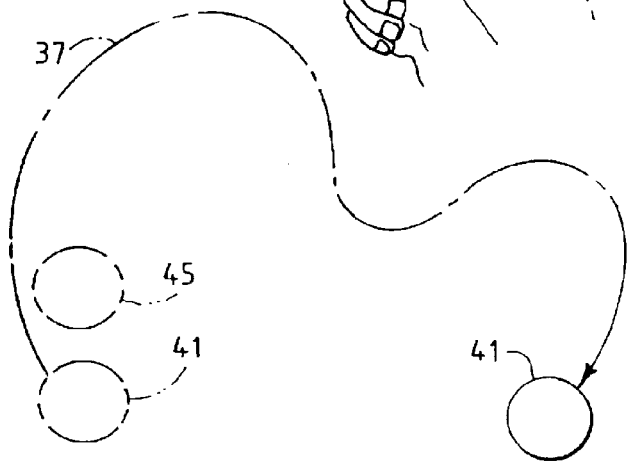
FIG. 2 shows light retro-reflected from a retro reflector in FIG. 1.

The retro-reflected light has a fixed component indicated for example by 41 in FIG. 2 which depicts retro-reflected light seen by the imager. The retro-reflected light also has a variable component which is varied by the person.

One example of the variable component is indicated by the path 37 along which the person moves the retro reflector. Another example of the variable component is indicated by a second retro reflector part 35 being first positioned to be seen 45 by the imager and later being positioned to be not visible to the imager.

A multiplicity of distinct variations of the variable component—comprising data—can be generated by the person varying positions of a retro reflector and varying configurations of more than one retro reflector part. This meaning of a variable component is distinct from the case where a person moves a bar-coded object so that an imager can read the fixed bar code.

When, in a time interval, the imager detects the variable component, the imager inputs a signal to the information system.

In the example depicted in FIG. 1 a variable component corresponds to the series of positions making up the path 37, and the signal comprises data identifying the series of positions along the path 37 in the time interval.

Also in the example depicted in FIG. 1 a variable component is a start configuration of the retro reflector 31 and the second retro reflector part 35 at the start of the path and is a stop configuration with the second retro reflector part obscured at the end of the path. The start configuration could be mapped by the imager as a start signal causing the information system to start 51 a trace 37A corresponding to the path, and the stop configuration could be mapped by the imager as a stop signal causing the information system to stop 52 the trace corresponding to the path.

Start and stop signals to start the trace and to stop the trace could also be input by other means such as key strokes, mouse clicks, and speech.

The information system need not visually display the trace, as the trace could be data used or stored by the information system. The trace could be in three spatial dimensions, and in time, in data used or stored by the information system. A second imager with light source, and more, could be used to help generate three dimensional data. Also, a wand-like retro reflector with two distal points separated by a known distance can be used to facilitate three dimensional data.

When, in the time interval, the imager detects the fixed component, 41 for example, the imager inputs an identity signal to the information system.

Figure 3:
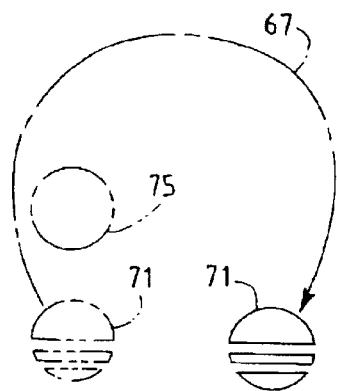
FIG. 3 shows light retro-reflected from a sequent retro reflector in FIG. 1.

In the example depicted in FIG. 1 there is also a sequent retro reflector 61 connected to a sequent person, and there is sequent retro-reflected light with a sequent fixed component 71 depicted in FIG. 3.

When, in the time interval, the imager detects the sequent fixed component 71 the imager inputs a sequent identity signal to the information system. The fixed components 41 and 71 are distinct and thus the sequent identity signal is distinct from the identity signal.

The sequent retro-reflected light also has a sequent variable component varied by the sequent person. One example of the sequent variable component is indicated by the path 67 along which the sequent person moves the sequent retro reflector 61. Another example of the sequent variable component is indicated by a sequent second retro reflector part 65 being first positioned to be seen 75 by the imager and later being positioned to be not visible to the imager.

When, in the time interval, the imager detects the sequent variable component, the imager inputs a sequent signal to the information system.

In the example depicted in FIG. 1 a sequent variable component corresponds to a series of positions making up the sequent path 67, and the sequent signal comprises data identifying the series of positions along the sequent path 67 in the time interval. The sequent signal can cause the information to trace a path 67A.

The retro reflector and the sequent retro reflector function interchangeably. The contents of the fixed component and the sequent fixed component are distinct. The contents of the variable component and the sequent variable component are varied by distinct persons and can be distinct.

An imager can distinguish retro-reflected light—45 and 41 for example—retro-reflected by a person from retro-reflected light—75 and 71 for example—retro-reflected by a sequent person because of the distinct fixed components and because distances between retro-reflected light retro-reflected by one person—45 and 41 for example—are smaller than distances between retro-reflected light retro-reflected light not retro-reflected from by one person—45 and 75 for example.

While 71 is shown to have bar code like configurations, other properties—such as shape and color—can also be used alone and in combinations to comprise fixed components.

In FIG. 1 the retro reflector is shown as a retro-reflecting disc attached to finger tips. Retro-reflecting objects can be attached to each of the fingers and to other portions of a hand such as knuckles and to other portions of the body. Various commercial retro reflecting materials—utilizing micro spheres and embossments for example—produce very high signal to noise ratios and can be put on hand portions in various ways—such as with adhesive, with rings, and with thimble-like devices.

Figure 4:
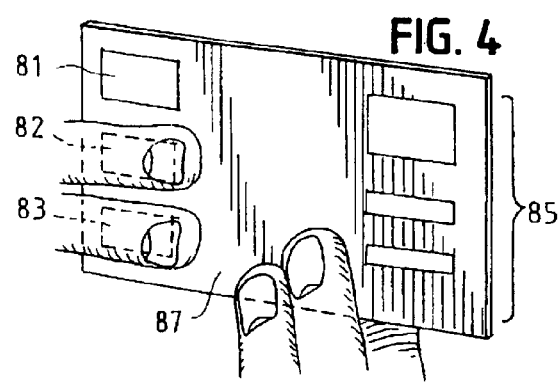
FIG. 4 shows a retro reflector on a card.

A retro reflector on a card 87 which can be held by a person is depicted in FIG. 4. A variable component is produced when the person obscures—with fingers, for example—one or more of retro-reflecting parts 81, 82, and 83. A fixed component comprises a set of retro-reflecting parts 85.

A retro reflector can be attached to a persons gear—head gear for example—so that positions of the person can be imaged from above to identify the person and trace the positions. An information system can attach an identifying label to a displayed image of the person. When many persons are so imaged, only selected traces can be displayed and can be color coded. Paths of players in a sporting event can be traced.

A retro reflector can be attached to a first aircraft transporting a person so that a light source and imager on a second aircraft can detect the presence and motion of the first aircraft.

Figure 5:
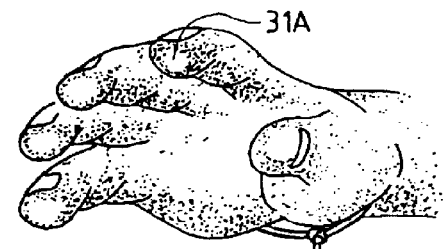
FIG. 5 shows a finger acting as a retro reflector and retro reflector parts on a cylinder.

In as much as a finger tip reflects light from the light source back to the imager with a signal to noise ratio greater than one, the finger tip—31A depicted in FIG. 5 for example—can be used in place of the retro reflector 31 though a poor signal to noise ratio will burden the imager. While finger tip properties—such as color—can provide the fixed component, this would further burden an imager. A fixed component—such as the retro-reflecting stripes 85A around a cylinder shown in FIG. 5—burdens the imager less.

The signal to noise ratio provided by a retro reflector can be increased. For example, a retro reflector can reflect a first electromagnetic radiation spectrum portion greater than other electromagnetic radiation spectrum portions, and the imager can be more sensitive to the first electromagnetic radiation spectrum portion than to other electromagnetic radiation spectrum portions.

Also, the light source can be modulated at a first frequency and the imager can be more sensitive to light modulated at the first frequency than to light modulated at other frequencies. With a modulated light source the distance between a retro reflector and the imager can be determined by time of flight measurement.

A scanner can be added. The scanner can be an imager scanner scanning the imager over a light source illuminated; can be a light scanner scanning the light source over an imager viewed solid angle; and can be a combined scanner scanning the imager and the light source together over a solid angle. Combinations of all the several signal to noise ratio improvement methods can be used.

Information processing capacity needed to detect the retro reflectors and generate inputted data can be incorporated in the imager itself so that the imager can input data to the information system in forms similar to forms provided by keystrokes and mouse devices. Information processing capacity of the information system can be used to detect retro reflectors and generate inputted data, in which case the information system is part of the imager while it is helping generate input data.

Variations of the variable component—such as range and speed of motion and relative configurations and motions of retro reflector parts—can be defined to execute members of a roster of signal components similarly to defining keystroke combinations.

The apparatus can be utilized interactively. For example, in response to a query communicated by the information system, a plurality of persons can input responses. Also, for each of a plurality of persons navigating a territory, the information system can communicate to each of the persons a person specific path from the location of each of the persons to a part of the territory sought by each of the persons.

The data processor can locate the retro reflector relative to a target object. The target object position can be determined by another retro reflector data input apparatus. The target object could be a game animal and this would enable realistic bloodless hunting. The target object could be another person and this would enable bloodless combat training and sport.

Other equivalent forms for the imager, the light source, the retro reflector, the fixed component, the variable component, the identity signal, and the signal; and other equivalent ways of using a retro reflector to input data to an information system will be obvious hereafter to persons skilled in the art. Therefore this invention is not limited to the particular examples shown and described here.

What is claimed is:

1. Data input apparatus used with an information system, the data input apparatus comprising:

an imager;
a light source adjacent to the imager;
a retro reflector, the retro reflector being connected to a person;
retro-reflected light, the retro reflected light being light from the light source which is retro-reflected by the retro reflector to the imager, the retro-reflected light having a fixed component, and the retro-reflected light having a variable component varied by the person, the variable component of the retro-reflected light caused by changing between obscuring and unobscuring at least a portion of the retro-reflector from within a field of view of the imager;
an identity signal, the identity signal being input to the information system by the imager when the fixed component is detected by the imager in a time interval; and
a signal, the signal being input to the information system by the imager when the variable component is detected by the imager in the time interval.

2. The apparatus of claim 1 further comprising:
a sequent retro reflector, the sequent retro reflector being connected to a sequent person;
sequent retro-reflected light, the sequent retro reflected light being light from the light source which is retro-reflected by the sequent retro reflector to the imager, the sequent retro-reflected light having a sequent fixed component, and the sequent retro-reflected light having a sequent variable component varied by the sequent person, the sequent variable component of the sequent retro-reflected light caused by changing between obscuring and unobscuring at least a portion of the sequent retro-reflector from within a field of view of the imager;
a sequent identity signal, the sequent identity signal being input to the information system by the imager when the sequent fixed component is detected by the imager in the time interval;
a sequent signal, the sequent signal being input to the information system by the imager when the sequent variable component is detected by the imager in the time interval.

3. The apparatus of claim 2 wherein the sequent retro reflector is connected to the sequent person.

4. The apparatus of claim 2 wherein the sequent fixed component is distinct from the fixed component and the sequent identity signal is distinct from the identity signal, thereby allowing the imager to distinguish light retro-reflected by the sequent retro reflector from light retro-reflected by the retro reflector.

5. The apparatus of claim 1 wherein the retro reflector reflects a first electromagnetic radiation spectrum portion greater than other electromagnetic spectrum portions and the imager is more sensitive to the first electromagnetic radiation spectrum portion than to the other electromagnetic radiation spectrum portions.

6. The apparatus of claim 1 wherein the light source is modulated at a first frequency and the imager is more sensitive to light modulated at the first frequency than to light modulated at other frequencies.

7. The apparatus of claim 1 wherein the retro reflector is on a hand portion of the person.

8. The apparatus of claim 1 wherein the retro reflector is on an object held by the person.

9. The apparatus of claim 1 wherein the retro reflector is on gear worn by the person.

10. The apparatus of claim 1 further comprising a second retro reflector being connected to the person and wherein obscuring at least a portion of the retro-reflector from within a field of view of the imager comprises the second retro reflector being changed between being positioned to be seen or invisible to the imager.

11. The apparatus of claim 1 further comprising an information processor, wherein the information processor processes variations of the variable component of the retro-reflected light that are defined to execute members of a roster of signal components.

12. The apparatus of claim 1 further comprising a display device adjacent the retro-reflector and visible to the person, the display device adapted to display information related to the variable component.

13. The apparatus of claim 12 further wherein the person can use the data input apparatus interactively by viewing information displayed on the display device and varying the variable component of the retro-reflected light.

14. The apparatus of claim 1 wherein the obscuring and unobscuring at least a portion of the retro-reflector from within a field of view of the imager comprises a start and stop configuration.

15. The apparatus of claim 14 wherein the start configuration starts the signal being input to the information system by the imager when the variable component is detected by the imager in the time interval and the stop configuration stops the signal being input to the information system by the imager when the variable component is detected by the imager in the time interval.

16. The apparatus of claim 15 wherein the signal comprises data identifying the series of positions the retro-reflector along a path in the time interval.

17. The apparatus of claim 1, wherein the start configuration starts the signal being input to the information system by the imager when the imager does of one the following: (a) detects the at least a portion of the retro-reflector is un-obscured; or (b) detects the at least a portion of the retro-reflector is obscured.

18. The apparatus of claim 1, wherein obscuring and un-obscuring at least a portion of the retro-reflector when the reflector is within a field of view of the imager comprises positioning at least a portion of the retro-reflector to be seen or invisible to the imager.

19. Data input apparatus used with an information system, the data input apparatus comprising:
an imager;
a scanner chosen from the group consisting of: an imager scanner scanning the imager over a light source illuminated solid angle; a light scanner scanning the light source over an imager viewed solid angle; and a combined scanner scanning the imager and the light source together over a solid angle;
a light source adjacent to the imager;
a retro reflector, the retro reflector being connected to a person;
retro-reflected light, the retro reflected light being light from the light source which is retro-reflected by the retro reflector to the imager, the retro-reflected light having a fixed component, and the retro-reflected light having a variable component varied by the person;
an identity signal, the identity signal being input to the information system by the imager when the fixed component is detected by the imager in a time interval;
a signal, the signal being input to the information system by the imager when the variable component is detected by the scanner in the time interval.

20. Data input apparatus used with an information system, the data input apparatus comprising:

a retro reflector, the retro reflector on a vehicle transporting the person;

retro-reflected light, the retro reflected light being light from the light source which is retro-reflected by the retro reflector to the imager, the retro-reflected light having a fixed component, and the retro-reflected light having a variable component varied by the person;

an identity signal, the identity signal being input to the information system by the imager when the fixed component is detected by the imager in a time interval; and a signal, the signal being input to the information system by the imager when the variable component is detected by the imager in the time interval.

* * * * *